United States Patent [19]
Fojtik et al.

[11] 3,910,676
[45] Oct. 7, 1975

[54] VIEWING DEVICE

[75] Inventors: Frank Fojtik; Ivan Dobis, both of Rego Park, N.Y.

[73] Assignee: The Raymond Lee Organization, Inc., New York, N.Y.; a part interest

[22] Filed: Oct. 7, 1974

[21] Appl. No.: 512,666

[52] U.S. Cl. ................................ 350/68; 350/319
[51] Int. Cl.² ........................................ G02B 23/02
[58] Field of Search ............ 350/21, 22, 25, 27, 68, 350/319, 202, 204

[56] References Cited
UNITED STATES PATENTS

| | | | |
|---|---|---|---|
| 3,074,315 | 1/1963 | Seibel et al. | 350/68 |
| 3,596,082 | 7/1971 | Doret et al. | 350/319 |

*Primary Examiner*—James W. Lawrence
*Assistant Examiner*—D. C. Nelms
*Attorney, Agent, or Firm*—Daniel Jay Tick

[57] ABSTRACT

A first tubular member extends through a door. A second tubular member has a smaller diameter than the diameter of the first tubular member and is coaxially positioned inside the first tubular member. A hollow hemispherical portion extends from the end of the second tubular member outside the door. The hemispherical portion has an outside convex surface covered with light reflective material. A viewing lens is mounted in the hemispherical portion in the plane of a major diameter thereof perpendicular to the axis of the tubular members. A mounting device slidably mounts the second tubular member for movement in axial directions in the first tubular member in a manner whereby when the second tubular member is positioned with the outside surface of the hemispherical portion thereof in abutment with the end of the first tubular member outside the door, a viewer inside the door sees directly through the second tubular member and when the second tubular member is positioned with the outside surface of the hemispherical portion thereof spaced from the end of the first tubular member outside the door, a viewer inside the door sees anything reflected from the outside surface of the hemispherical portion through the first tubular member.

2 Claims, 5 Drawing Figures

U.S. Patent  Oct. 7, 1975  3,910,676
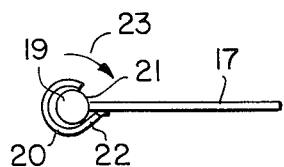
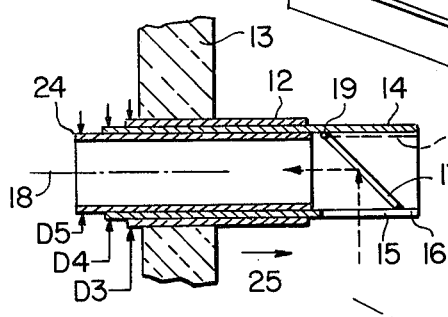
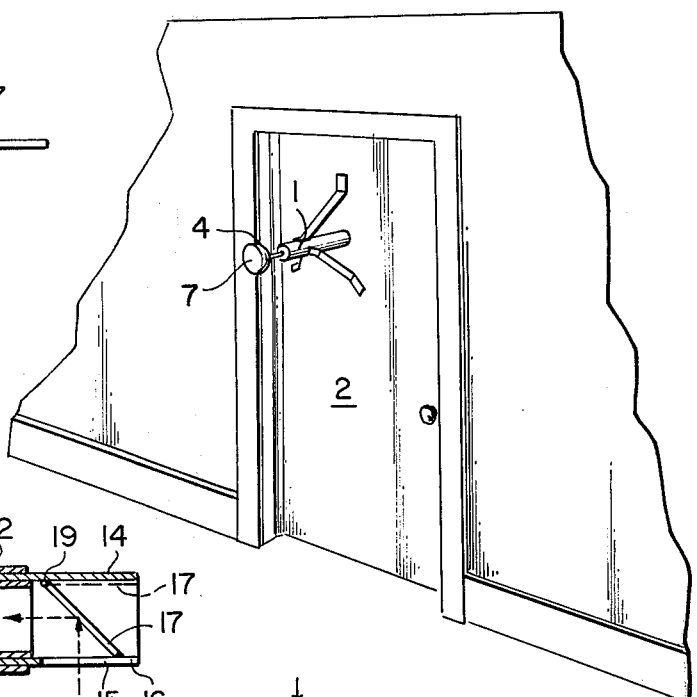
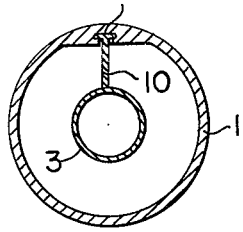
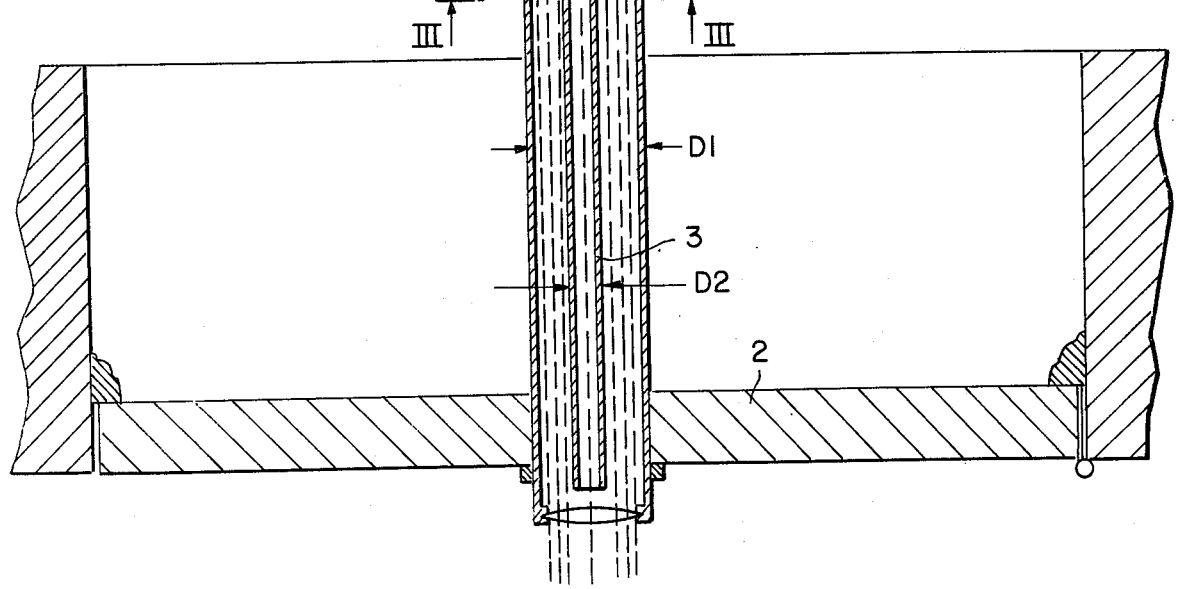

VIEWING DEVICE

DESCRIPTION OF THE INVENTION:

The present invention relates to a viewing device for a door.

Objects of the invention are to provide a viewing device for a door, of simple structure, which is inexpensive in manufacture, installed with facility and convenience in new and existing doors, utilized with facility and convenience, and functions efficiently, effectively and reliably to permit anyone inside a door to see anything or anyone outside the door either directly in front of the door or on either side of the door.

In order that the invention may be readily carried into effect, it will now be described with reference to the accompanying drawing, wherein:

FIG. 1 is a schematic diagram of a first embodiment of the viewing device of the invention;

FIG. 2 is a sectional view, taken along the axis, of the embodiment of FIG. 1 of the viewing device of the invention;

FIG. 3 is a cross-sectional view, taken along the lines III—III, of FIG. 2;

FIG. 4 is a cross sectional view, taken along the axis, of another embodiment of the viewing device of the invention; and FIG. 5 is a view, on an enlarged scale, of the pivotal mounting device of the mirror of the embodiment of FIG. 4.

The embodiment of FIGS. 1, 2 and 3 of the viewing device of the invention comprises a first tubular member 1 extending through a door 2 and having a predetermined diameter D1.

A second tubular member 3 has a smaller diameter D2 than the predetermined diameter D1 and is coaxially positioned inside the first tubular member 1.

A substantially hollow hemispherical portion 4 extends from the end 5 of the second tubular member 3 outside the door 2. The hemispherical portion 4 has an outside convex surface 6 covered with light reflective material.

A viewing lens 7 is mounted in the hemispherical portion 4 in the plane of a major diameter thereof substantially perpendicular to the axis 8 of the tubular members 1 and 3.

A mounting device of any suitable type slidably mounts the second tubular member 3 for movement in axial directions in the first tubular member 1. A suitable mounting device may comprise, for example, that shown in FIG. 3, wherein a slot 9 is formed in the first tubular member 1 extending substantially parallel to the axis 8 and a corresponding guide bar 10 is accommodated in the slot and supports the second tubular member 3 for movement in said slot.

When the second tubular member 3 is positioned with the outside surface 6 of the hemispherical portion 4 thereof in substantial abutment with the end 11 of the first tubular member 1 outside the door, which position is not shown in the FIGS., a viewer inside the door sees directly through the second tubular member. When the second tubular member 3 is positioned with the outside surface 6 of the hemispherical portion 4 thereof spaced from the end 11 of the first tubular member 1 outside the door, as shown in FIG. 2, a viewer inside the door sees anything reflected from the outside surface of the hemispherical portion through the first tubular member.

The embodiment of FIGS. 4 and 5 of the viewing device of the invention comprises a first tubular member 12 extending through a door 13 and having a predetermined first diameter D3.

A second tubular member 14 has a second diameter D4 smaller than the first diameter and is coaxially rotatably positioned inside the first tubular member 12. A window 15 of transparent material, preferably clear glass or plastic, is provided in the second tubular member 14 in the area of the end 16 thereof outside the door 13.

A substantially planar mirror 17 is pivotally mounted in the second tubular member 14 opposite the window 15 at a predetermined distance from the end 16 of said tubular member outside the door 13. The mirror 17 is mounted in a manner whereby it is positionable from a first position, shown in solid lines in FIG. 4, at substantially 45° with the axis 18 of the tubular members 12 and 14 extending from the pivot point 19 to the end 16 of the second tubular member 14 outside the door, to a second position substantially adjacent the inside surface of the second tubular member, shown by broken lines in FIG. 4, substantially parallel with said axis.

As shown in FIG. 5, a spring of any suitable type such as, for example, a spiral spring 20, urges the mirror 17 to its first position, shown in FIG. 4. One end 21 of the spring 20 is affixed to the pivot pin 19 and the other end 22 of said spring is affixed to the mirror 17. The spring constantly tries to unwind, and thus constantly urges the mirror 17 in the direction of an arrow 23 (FIG. 5) which is a direction away from the aforedescribed second position of said mirror.

A third tubular member 24 has a third diameter D5 smaller than the second diameter D4. The third tubular member 24 is coaxially slidably positioned inside the second tubular member 14 in a manner whereby when the third tubular member is spaced from the mirror 17, as shown in FIG. 4, the mirror is in its first position, as shown in FIG. 4, and a viewer inside the door 13 sees anything reflected from the surface of the mirror through said third tubular member. The viewer sees anything around the end 16 of the second tubular member 14 outside the door by rotating the second tubular member about its axis 18. When the third tubular member 24 is moved into abutment with the mirror 17, by being moved along the axis 18 in the direction of an arrow 25, the mirror is moved by the third tubular member to its second position, shown by broken lines in FIG. 4, and the viewer sees directly through said third tubular member.

In the embodiment of FIG. 2 of the invention, when the second tubular member 3 is extended beyond the first tubular member 1, the device functions as a universal periscope, and in the embodiment of FIG. 4, when the third tubular member 24 is maintained free from the mirror 17, the device functions as a right-angled periscope.

While the invention has been described by means of a specific example and in a specific embodiment, we do not wish to be limited thereto, for obvious modifications will occur to those skilled in the art without departing from the spirit and scope of the invention.

We claim:

1. A viewing device for a door, comprising a first tubular member extending through a door and having a predetermined diameter;

a second tubular member having a smaller diameter than the predetermined diameter coaxially positioned inside the first tubular member;

a substantially hollow hemispherical portion extending from the end of the second tubular member outside the door, the hemispherical portion having an outside convex surface covered with light reflective material;

a viewing lens mounted in the hemispherical portion in the plane of a major diameter thereof substantially perpendicular to the axis of the tubular members; and mounting means slidably mounting the second tubular member for movement in axial directions in the first tubular member in a manner whereby when the second tubular member is positioned with the outside surface of the hemispherical portion thereof in substantial abutment with the end of the first tubular member outside the door, a viewer inside the door sees directly through the second tubular member and when the second tubular member is positioned with the outside surface of the hemispherical portion thereof spaced from the end of the first tubular member outside the door, a viewer inside the door sees anything reflected from the outside surface of the hemispherical portion through the first tubular member.

2. A viewing device for a door, comprising a first tubular member extending through a door and having a predetermined first diameter;

a second tubular member having a second diameter smaller than the first diameter coaxially rotatably positioned inside the first tubular member;

a window in the second tubular member in the area of the end thereof outside the door;

a substantially planar mirror pivotally mounted in the second tubular member opposite the window at a predetermined distance from the end thereof outside the door in a manner whereby the mirror is positionable from a first position at substantially 45° with the axis of the tubular members extending from the pivot point to the end of the second tubular member outside the door to a second position substantially adjacent the inside surface of the second tubular member substantially parallel with the axis thereof;

spring biasing means urging the mirror to its first position; and a third tubular member having a third diameter smaller than the second diameter coaxially slidably positioned inside the second tubular member in a manner whereby when the third tubular member is spaced from the mirror, the mirror is in its first position and a viewer inside the door sees anything reflected from the surface of the mirror through the third tubular member and sees anything around the end of the second tubular member outside the door by rotating the second tubular member about its axis and when the third tubular member is moved into abutment with the mirror, the mirror is moved by the third tubular member to its second position and a viewer inside the door sees directly through the third tubular member.

\* \* \* \* \*